US011733736B1

(12) United States Patent
Wang

(10) Patent No.: US 11,733,736 B1
(45) Date of Patent: Aug. 22, 2023

(54) MOBILE TERMINATION PROTECTIVE SHELL

(71) Applicant: Shenzhen Taersen Technology Co., Ltd., Shenzhen (CN)

(72) Inventor: Shubo Wang, Shenzhen (CN)

( * ) Notice: Subject to any disclaimer, the term of this patent is extended or adjusted under 35 U.S.C. 154(b) by 0 days.

(21) Appl. No.: 17/827,865

(22) Filed: May 30, 2022

(30) Foreign Application Priority Data

May 16, 2022 (CN) .......................... 202221167849.4

(51) Int. Cl.
*G06F 1/16* (2006.01)
*H04M 1/02* (2006.01)
*A45C 11/00* (2006.01)
*A45C 13/00* (2006.01)

(52) U.S. Cl.
CPC ............ *G06F 1/1656* (2013.01); *A45C 11/00* (2013.01); *A45C 13/001* (2013.01); *G06F 1/1681* (2013.01); *H04M 1/0216* (2013.01); *A45C 2011/003* (2013.01)

(58) Field of Classification Search
CPC ..... G06F 1/1656; G06F 1/1681; A45C 11/00; A45C 13/001; A45C 2011/003; H04M 1/0216
See application file for complete search history.

(56) References Cited

U.S. PATENT DOCUMENTS

| 8,820,525 B1* | 9/2014 | Zanxiang | F16M 11/10 |
| | | | 206/45.24 |
| 8,960,634 B2* | 2/2015 | Le Gette | B65H 75/4476 |
| | | | 248/176.1 |
| 2011/0252601 A1* | 10/2011 | Lin | G06F 1/1681 |
| | | | 16/280 |

* cited by examiner

*Primary Examiner* — Lester G Kincaid
*Assistant Examiner* — Maryam Soltanzadeh
(74) *Attorney, Agent, or Firm* — Daniel M. Cohn; Howard M. Cohn

(57) ABSTRACT

The present disclosure provides the mobile termination protective shell, including: a shell body, a supporting plate, a supporting frame, an angle limiter, and an inner cover plate. Electronic product such as the mobile termination is arranged in an accommodating cavity of the shell body, and the inner cover plate is plugged into the through hole, The inner cover plate is in contact with the back of the mobile termination, and the supporting plate is rotated relative to the shell body around an axis in the through hole. At the same time, the supporting frame is rotated with the supporting plate around the axis, that is, a 360° supporting angle is obtained, which is adapted to more supporting angles and supporting scenarios. Furthermore, the angle limiter is located at the circumferential side wall of the supporting plate, which is used to limit the rotation angle of the supporting plate.

12 Claims, 7 Drawing Sheets

MOBILE TERMINATION PROTECTIVE SHELL

TECHNICAL FIELD

The present disclosure relates to a technical field of electronic product accessories, and in particular to a mobile termination protective shell.

BACKGROUND

With the upgrading of digital products, mobile termination devices such as tablet computers continue to become a part of people's lives.

Due to the limitations in the design of tablet computers, users need to use a stand for long-term use. At present, many protective shell structures have been introduced, which can also play a role of temporary supporting while protecting mobile terminations such as tablet computers.

However, the current protective shell has a limited supporting angle for the tablet computers, thereby limiting the use of the tablet computers.

SUMMARY

In order to solve the problem that the existing protective shell has limitations in the use of the mobile termination, the present disclosure provides the mobile termination protective shell, including: a shell body, a supporting plate, a supporting frame, an angle limiter, and an inner cover plate.

The shell body is provided with an accommodating cavity for accommodating the mobile termination, and the bottom of the accommodating cavity is provided with a through hole penetrating the bottom of the accommodating cavity; the supporting plate is arranged at the through hole, and the supporting plate is rotated about the axis relative to the shell body around the center point of the through hole; one end of the supporting frame is hinged to the supporting plate, and the other end is opened and closed relative to the supporting plate; the angle limiter is fixed at the through hole and located on the outer peripheral side of the supporting plate, and the angle limiter is used to limit the rotation angle of the supporting plate; the inner cover plate is provided on the inner side of the bottom of the accommodating cavity and is used for plugging the through hole.

The mobile termination protective shell provided by the present disclosure has beneficial effects as follows.

The mobile termination protective shell, including: a shell body, a supporting plate, a supporting frame, an angle limiter, and an inner cover plate; and electronic products such as mobile terminations are arranged in the accommodating cavity of the shell body, and the inner cover plate is plugged in the through hole, that is, the supporting plate rotates with respect to the shell body around the axis in the through hole. During the rotation, in order to play a protective role, the supporting plate isn't contacted with the mobile termination in the accommodating cavity. At the same time, the supporting frame is rotated with the supporting plate around the axis, that is, a 360° supporting angle is obtained, which is adapted to more supporting angles and supporting scenarios. Furthermore, the angle limiter is located at the circumferential side wall of the supporting plate, which is used to limit the rotation angle of the supporting plate, that is, to maintain the rotation angle of the supporting plate relative to the shell body, that is, to maintain the relationship between the supporting frame and the shell body rotation angle. In summary, the mobile termination protective shell is adapted to more use scenarios, which is less limited and more convenient to use.

In one embodiment, the angle limiter includes a plurality of limit bodies disposed along the circumferential direction of the supporting plate and a connecting arm for connecting two adjacent limit bodies; the limiting body is fixedly connected to the shell body, and the connecting arm abuts against the circumferential side wall of the supporting plate.

In one embodiment, a convex part is provided on the connecting arm; a concave part adapted to the convex part is provided on the circumferential side wall of the supporting plate; wherein, when the supporting plate rotates around the axis, each of the convex portions is alternately placed in the corresponding concave portion.

In one embodiment, the connecting arm is provided with an insertion slot, the bottom of the shell body is provided with a rib plate adapted to the insertion slot, and the arrangement direction of each rib plate is along the radial orientation of the supporting plate.

In one embodiment, the angle limiter includes a plurality of tooth structures which are provided on the shell body, and groove structures adapted to the tooth structures which are formed on the circumferential side wall of the supporting plate.

In one embodiment, the supporting frame includes a first supporting plank, the supporting plate is provided with a first accommodating groove for accommodating the first supporting plank, and the end surface of the first supporting plank is flush with the end surface of the supporting plate, and one end of the first supporting plank is hinged to the side wall of the first accommodating groove.

In one embodiment, the other end of the first supporting plank is provided with a first notch, the side wall of the first accommodating groove is concave inward to form a second notch; and the second notch is corresponded to the first notch.

In one embodiment, the supporting frame also includes a second supporting plate, and a side of the first supporting plank facing the supporting plate is inwardly concave to form a second accommodating groove; one end of the second supporting plate is hinged to the side wall of the second accommodating groove and the other end is slidably connected to the supporting plate, and the opening and closing direction of the second supporting plate is opposite to the opening and closing direction of the first supporting plank.

In one embodiment, the bottom of the first accommodating groove is provided with a strip-shaped hole, and a baffle plate is also provided at the bottom of the first accommodating groove; the baffle plate is extended along the opening and closing direction of the strip-shaped hole and blocked part of the strip-shaped hole, the other end of the second supporting plate is provided with a connecting ear, and the connecting ear is extended into the strip-shaped hole and is clip-connecting to the baffle plate; wherein, the connecting ears slide within the strip-shaped hole to define an opening and closing angle of the second supporting plate relative to the first supporting plank.

In one embodiment, a block is provided at the bottom of the first accommodating groove, and the block is used to maintain the maximum opening and closing angle of the second supporting plate relative to the first supporting plank.

In one embodiment, the first supporting plank is provided with a first reinforcing rib structure.

In one embodiment, the supporting plate is provided with a second reinforcing rib structure.

In one embodiment, the shell body includes: a lower protective cover, an upper protective cover fastened to the lower protective cover, and the lower protective cover is provided with the through hole.

In one embodiment, the lower protective cover is provided with a third reinforcing rib structure.

In one embodiment, the lower protective cover is provided with a mounting post, the limiting body is provided with a first mounting hole, the inner cover plate is provided with a second mounting hole, and the second mounting hole, the first mounting hole and the mounting post correspond to each other.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

Figure 1:
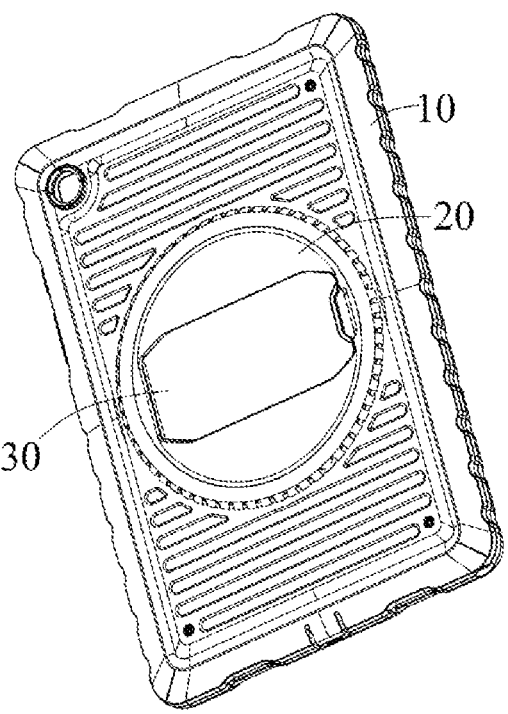
FIG. 1 is a schematic structural diagram which is a supporting plate of a mobile termination protective shell in a closed state.

Reference number in the drawings:

| shell body | 10 | accommodating cavity | 10a |
| through hole | 10b | rib plate | 10c |
| lower protective cover | 11 | upper protective cover | 12 |
| third reinforcing rib structure | 13 | mounting post | 14 |
| supporting plate | 20 | first accommodating groove | 20a |
| second notch | 20b | strip-shaped hole | 20c |
| convex part | 20d | baffle plate | 21 |
| block | 22 | second reinforcing rib structure | 23 |
| supporting arm | 30 | first supporting plank | 31 |
| first notch | 30a | second supporting plate | 32 |
| second accommodating groove | 30b | connecting ear | 321 |
| first rib structure | 311 | angle limiter | 40 |
| limiting body | 41 | connecting arm | 42 |

-continued

| convex part | 421 | insertion slot | 42a |
| first mounting hole | 42b | inner cover plate | 50 |
| second mounting hole | 50a | | |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In the description of the present disclosure, it should be understood that orientation or positional relationship indicated by terms "length", "width", "upper", "lower", "front", "rear", "left", "right", "vertical", "horizontal", "top", "bottom", "inner", "outer" and so on are based on the orientation or positional relationship shown in the drawings, rather than indicating or implying that an indicated device or an indicated element must have a particular orientation, are constructed and operated in a particular orientation, and are therefore not to be construed as limiting the present disclosure.

In addition, terms such as "first" and "second" are only used for the purpose of description, rather than being understood to indicate or imply relative importance or hint the number of indicated technical features. Thus, the feature limited by "first" and "second" can explicitly or impliedly include at least one feature. In the description of the present disclosure, the meaning of "a plurality of" is at least two, unless otherwise specified.

In the present disclosure, the terms such as "mounting", "connected", "connected to", "fixed at", and the others should be understood in a broad sense unless expressly stated or limited otherwise; for example, it may be a fixed connection or a detachable connection, or integrated; it can be a mechanical connection or an electrical connection; it can be a direct connection or an indirect connection through an intermediate medium, and it can be the internal connection of the two elements or the interaction relationship between the two elements. For a person having ordinary skill in art, the specific meanings of the above terms in the present invention can be understood according to specific situations.

Referring to FIG. 1 to FIG. 5, the mobile termination protective shell provided by the embodiment of the present disclosure is used to protect a touch-screen mobile termination such as a tablet computer and a mobile phone.

The mobile termination protective shell includes a shell body 10, a supporting plate 20, a supporting frame 30, an angle limiter 40 and an inner cover plate 50; one end of the supporting frame 30 is hinged to the supporting plate 20, and the other end of supporting frame 30 is opened and closed relative to the supporting plate; the angle limiter 40 is fixed at the through hole 10b and located on the outer peripheral side of the supporting plate 20, and the angle limiter 40 is used to limit the rotation angle of the supporting plate 20; the inner cover plate 50 is provided on the inner side of the bottom of the accommodating cavity 10a and is used for plugging the through hole 10b; the inner side of the bottom of the shell body 10 and the inner side of the inner cover plate 50 together form an end surface supporting the mobile termination; in this way, no matter how the supporting plate 20 is rotated about the axis, the mobile termination in the accommodating cavity 10a will not be scratched, that is, the terminal product is protected. At the same time, the supporting frame 30 is rotated about the axis with the supporting plate 20 to obtain a 360° rotation angle, which can not only satisfy the horizontal screen placement and vertical placement of the mobile termination, but also be suitable for use scenarios with other angles. The function of the angle limiter 40 is to maintain the rotation angle of the supporting plate 20 and the shell body 10, that is, to maintain the rotation angle of the supporting frame 30 and the shell body 10.

As an example, the angle limiter 40 can be a closed annular structure, the inner wall of which abuts against the circumferential side wall of the supporting plate 20 and limits the rotation angle of the supporting plate 20 relative to the shell body 10. For example, at least one of the inner wall of the annular structure and the circumferential side wall of the supporting plate 20 is provided with a non-slip layer with a high frictional coefficient, that is, the rotation angle is actually limited by the frictional force between the two. Or, the inner wall of the annular structure and the circumferential side wall of the supporting plate 20 are provided with mutually matching convex and recess structures, and the current rotation angle of the supporting plate 20 is limited when the convex structures are snapped into the corresponding recess structures.

As an example, the angle limiter 40 can also be a non-closed structure. In this case, the angle limiter 40 is a plurality of independent structures, each one of which directly abuts against the circumferential side wall of the supporting plate 20, and limits the rotation angle of the supporting plate 20 relative to the shell body 10. The independent structures are elastic protrusion provided on the shell body 10. The elastic protrusion is a mater material that is easily deformed such as rubber, which can be satisfied the rotation of the supporting plate 20 relative to the shell body 10 around the axis, and at the same time, can abut against the circumferential side walls of the supporting plate 10 so as to achieve the angle limitation. In addition, the structural form of the supporting frame 30 is not limited as long as it can be supported the shell body 10. For example, the supporting frame 30 can be a traditional plate-like structure, or can be a tripod structure or the like.

The present disclosure provides the mobile termination protective shell, including: a shell body 10, a supporting plate 20, a supporting frame 30, an angle limiter 40, and an inner cover plate 50. Electronic product such as the mobile termination is arranged in an accommodating cavity 10a of the shell body 10, and the inner cover plate 50 is plugged into the through hole 10b. The inner cover plate 50 is in contact with the back of the mobile termination, and the supporting plate 20 is rotated about the axis relative to the shell body 10 around the axis in the through hole 10b. During the rotation, in order to play a protective role, the supporting plate 20 isn't in contact with the mobile termination in the accommodating cavity 10a. At the same time, the supporting frame 30 is rotated with the supporting plate 20 around the axis, that is, a 360° supporting angle is obtained, which is adapted to more supporting angles and supporting scenarios. Furthermore, the angle limiter 40 is located at the circumferential side wall of the supporting plate 20, which is used to limit the rotation angle of the supporting plate 20, that is, to maintain the rotation angle of the supporting plate 20 relative to the shell body 10, that is, to maintain the relationship between the supporting frame 30 and the shell body 10 rotation angle between. The mobile termination protective shell is adapted to more use scenarios, which has less limitations and more convenient to use.

Figure 5:
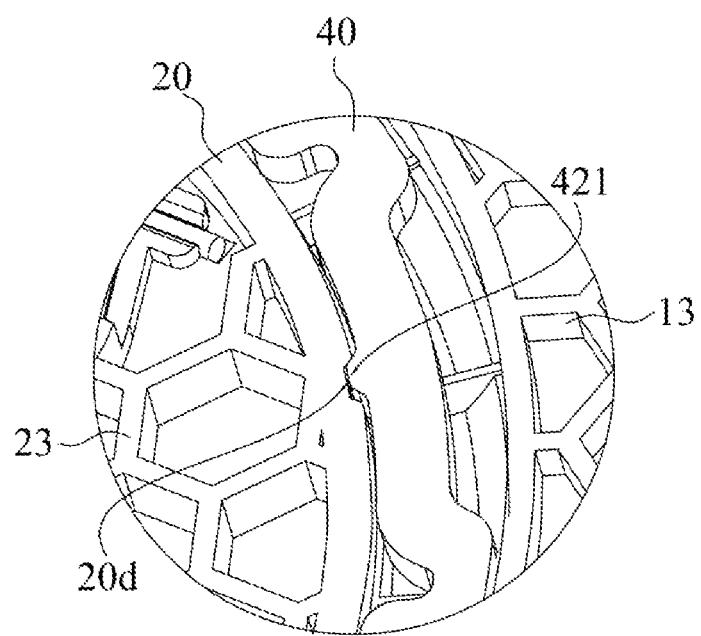
FIG. 5 is the enlarged view of A place in FIG. 4.
Figure 7:
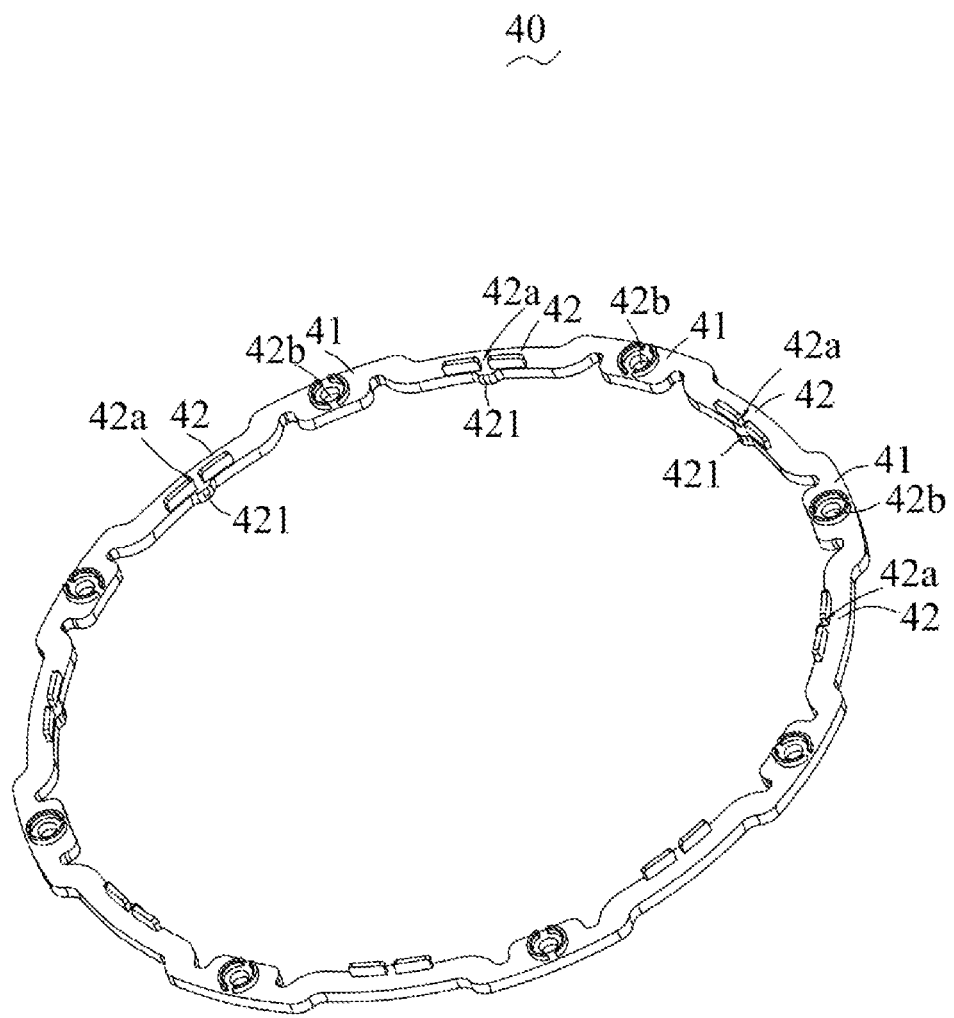
FIG. 7 is a schematic structural diagram which is an angle limiter of the mobile termination protective shell according to an embodiment of the present disclosure.
Figure 8:
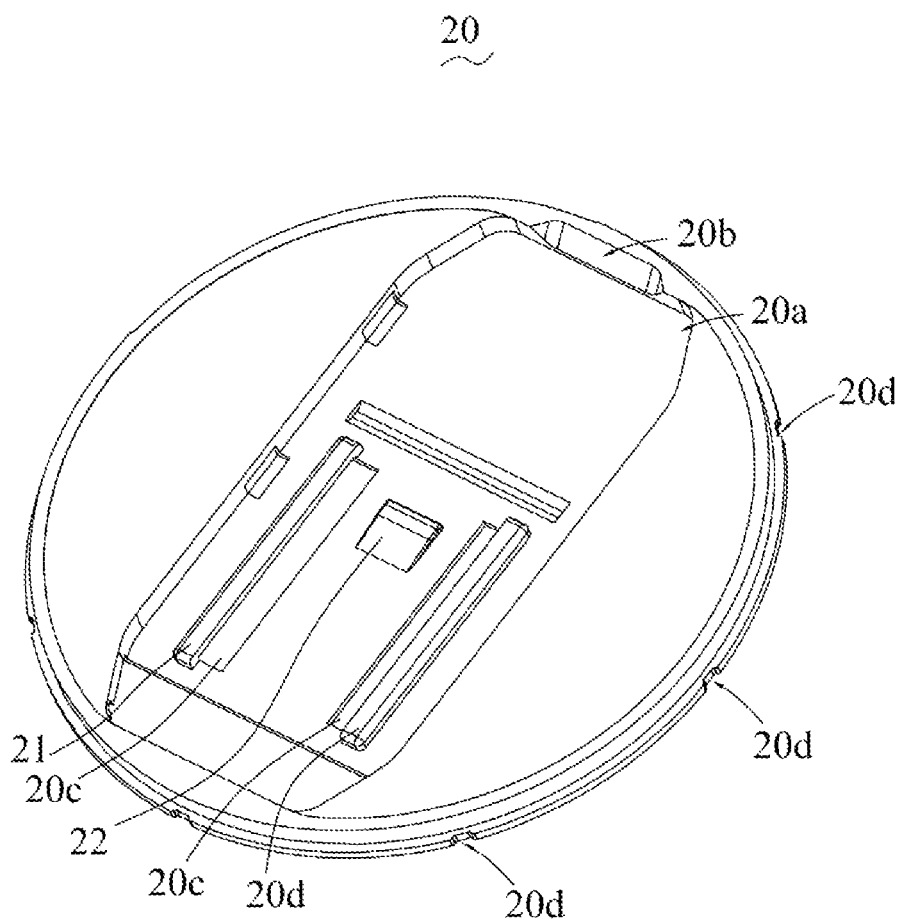
FIG. 8 is a schematic structural diagram which is the supporting plate of the mobile termination protective shell according to an embodiment of the present disclosure.

Referring to FIG. 5, FIG. 7 and FIG. 8, in one embodiment, the angle limiter 40 includes a plurality of limiting bodies 41 arranged along the circumferential direction of the supporting plate 20 and a connecting arm 42 for connecting two adjacent limiting bodies 41. The limiting body 41 is fixedly connected to the shell body 10, and the connecting arm 42 abuts against the circumferential side wall of the supporting plate 20. It may be understood that the plane of the connecting arm 42 between two adjacent limiting bodies 41 are coplanar with the supporting plate 20 so that when the supporting plate 20 is rotated relative to the shell body 10 around the axis, which is acted directly on the circumferential side wall of the supporting plate 20, used to limit the angle of rotation.

For example, in terms of structure, there is a notch structure that satisfies the deformation at the connection between the opposite ends of each connecting arm 42 and the two adjacent limiting bodies 41, so that the connecting arm 42 is more likely to be deformed in the interaction with the supporting plate 20, in order to satisfy the limit of its rotation angle.

For example, in terms of material, the material of the connecting arm 42 is easier to deform than the limiting body 41.

Referring to FIG. 7, in one embodiment, the connecting arm 42 is provided with a convex portion 421, and the circumferential side wall of the supporting plate 20 is provided with a concave portion 20d adapted to the convex portion 421.

Understandably, during the rotation of the supporting plate 20 relative to the shell body 10, the convex portion 421 on the connecting arm 42 is in contact with the circumferential side wall of the supporting plate 20 to achieve the purpose of fading the rotation. When rotated to the preset angle, the convex portion 421 is placed in the corresponding concave portion 20d. At this time, a "click" can be heard. In this way, the angle limiter 40 is temporarily locked the supporting plate 20 and is supported the supporting plate 20. The supporting plate 20 is no longer rotated relative to the shell body 10 until the external force is pushed the convex portion 421 to slip out of the concave portion 20d, and the supporting plate 20 is rotated relative to the shell body 10 again. Therefore, it is possible to define an angle at which the supporting plate 20 can be rotated each time by providing different numbers of the convex portion 421 and the concave portion 20d. It is easy to deduce that the setting positions of the convex portion 421 and the concave portion 20d can be exchanged; alternatively, the connecting arm 42 is provided with both the convex portion 421 and the concave portion 20d, and at the same time, the supporting plate 20 is also provided with the concave portion 20d and the convex portion 421 at the corresponding position.

Referring to FIG. 7, in one embodiment, the connecting arm 42 is provided with an insertion slot 42a, the bottom of the shell body 10 is provided with a rib plate 10c adapted to the insertion slot 42a, and the arrangement direction of each rib plate 10c is along the radial orientation of the supporting plate 20. It can be understood that the angle limiter 40 should be kept relatively stationary with the shell body 10 to satisfy the function of limiting the rotation of the supporting plate 20. Wherein, the limiting body 41 can be connected with the shell body 10 by screws. However, in order to avoid the only stress between the limiting body 41 and the shell body 10, the insertion slot 42a is provided on the side of the connecting arm 42 facing the shell body 10, and a corresponding position at the bottom of the shell body 10 is provided. There is a rib plate 10c, and when the rib plate 10c is inserted into the corresponding insertion slot 42a, a locking force is formed, that is, That is, there is also an interaction force between the connecting arm 42 and the shell body 10, which further improves the connection strength between the angle limiter 40 and the shell body 10.

In another embodiment, the angle limiter 40 includes a plurality of tooth structures which are provided on the shell body 10, and groove structures adapted to the tooth structures which are formed on the circumferential side wall of the supporting plate 20. It can be understood that the angle limiter 40 is composed of a plurality of independent structures, each of which is enclosed to form a non-closed angle limiter 40. Similarly, the requirement for fading rotation of the supporting plate 20 is achieved through the adaptation of a tooth structure and a groove structure.

Figure 2:
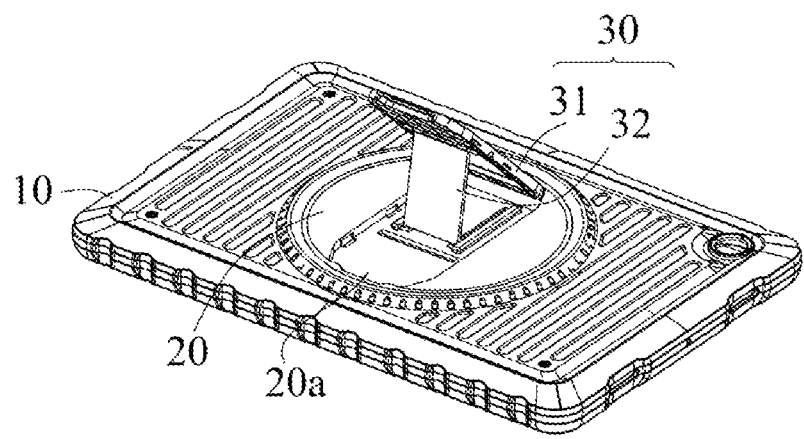
FIG. 2 is a schematic structural diagram which is the supporting plate of the mobile termination protective shell according to an embodiment of the present disclosure in an open state.

Referring to FIG. 2, in one embodiment, the supporting frame 30 includes a first supporting plank 31, the supporting plate 20 is provided with a first accommodating groove 20a for accommodating the first supporting plank 31, and the end surface of the first supporting plank 31 is flush with the end surface of the supporting plate 20, and one end of the first supporting plank 31 is hinged to the side wall of the first accommodating groove 20a. From the perspective of the overall shape and structure, it can be understood that the first supporting plank 31 is well received in the first accommodating groove 20a, so that the overall moving and rotating protective frame is more beautiful and the volume is smaller. At the same time, the purpose of supporting is achieved through the rotation opening and closing of one end of the first supporting plank 31 relative to the shell body 10.

Figure 9:
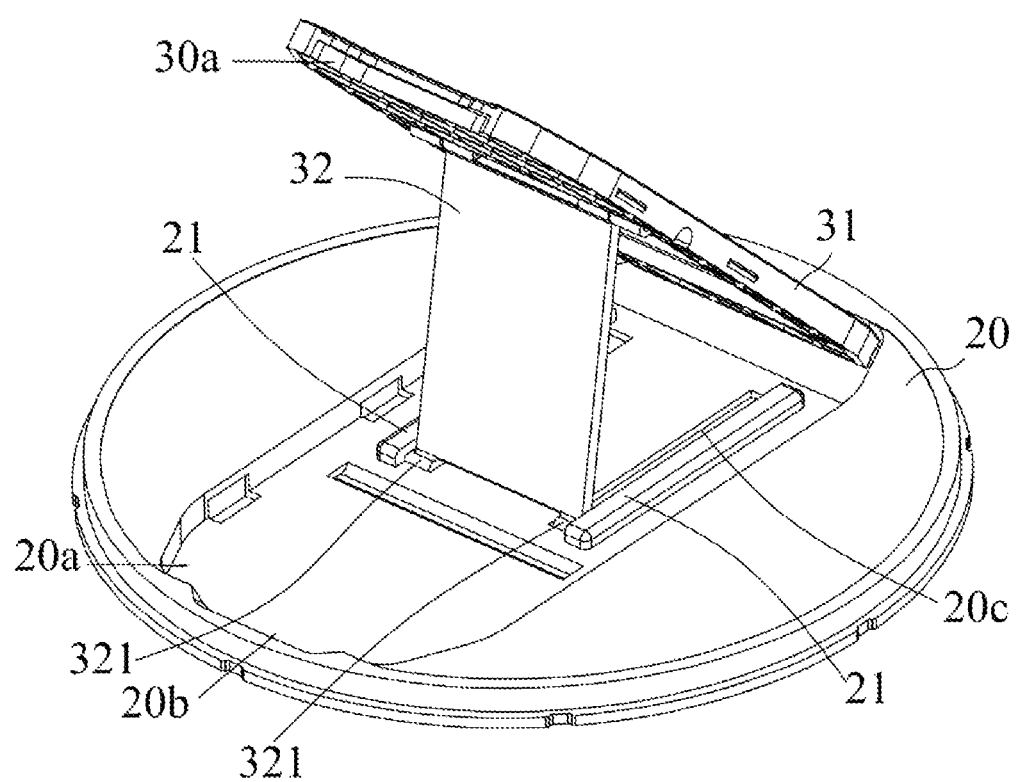
FIG. 9 is a schematic structural diagram which is a supporting frame and the supporting plate of the mobile termination protective shell according to an embodiment of the present disclosure.

Referring to FIG. 8 and FIG. 9, in one embodiment, the other end of the first supporting plank 31 is provided with a first notch 30a, the side wall of the first accommodating groove 20a is concave inward to form a second notch 20b; and the second notch 20b is corresponded to the first notch 30a. It can be understood that the oppositely disposed first notch 30a and the second notch 20b are formed a space for the user's fingers to insert, so as to facilitate the user to take out the first supporting plank 31 from the supporting plate 20.

Figure 6:
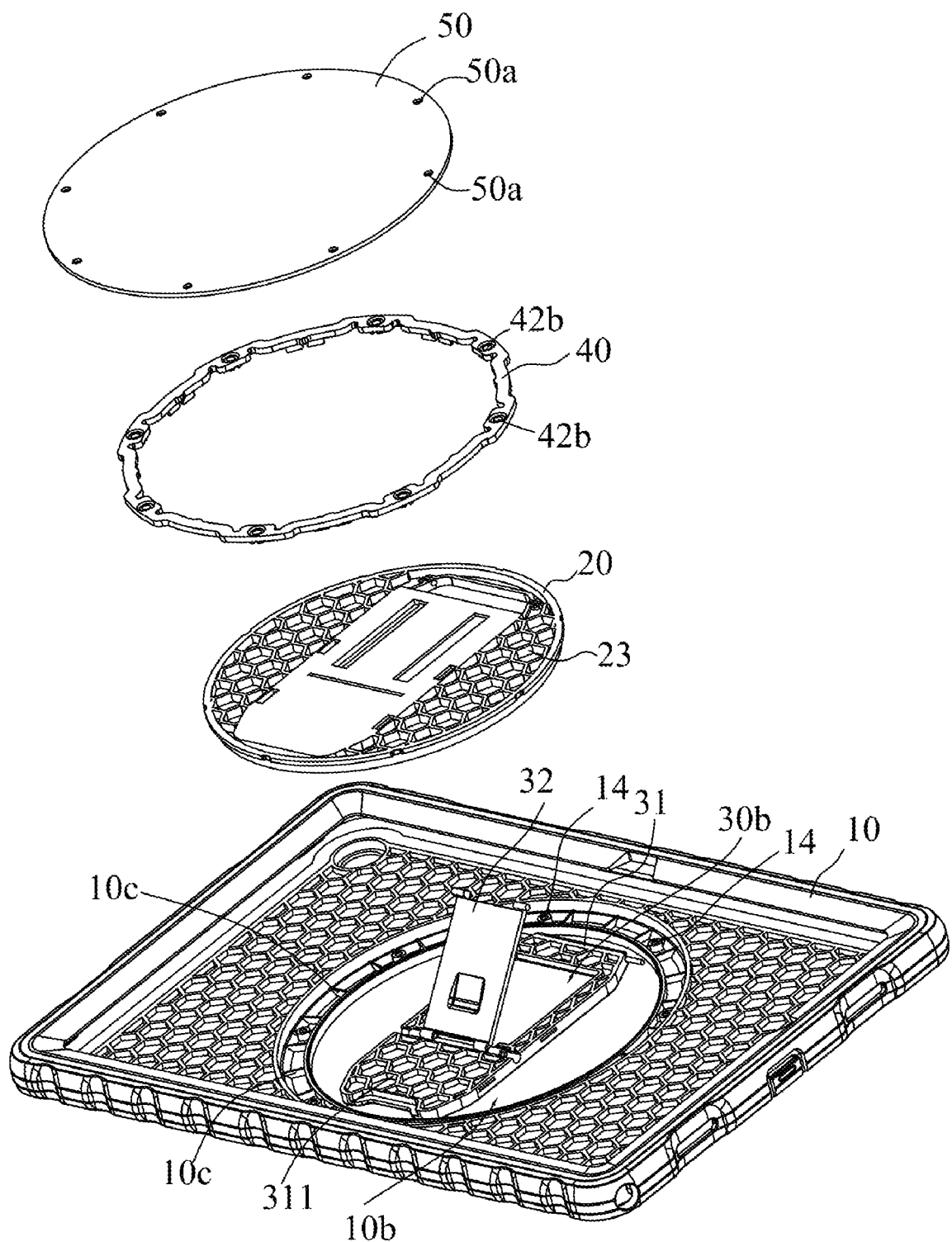
FIG. 6 is an exploded view which is another angle of the mobile termination protective shell according to an embodiment of the present disclosure.

Referring to FIG. 2, FIG. 6 and FIG. 9, in one embodiment, the supporting frame 30 also includes a second supporting plate 32, and a side of the first supporting plank 31 facing the supporting plate 20 is inwardly concave to form a second accommodating groove 30b; one end of the second supporting plate 32 is hinged to the side wall of the second accommodating groove 30b and the other end is slidably connected to the supporting plate 20, and the opening and closing direction of the second supporting plate 32 is opposite to the opening and closing direction of the first supporting plank 31. It can be understood that the function of the second supporting plate 32 is to maintain the opening angle of the first supporting plank 31 relative to the supporting plate 20, that is, the second supporting plate 32 is located between the first supporting plank 31 and the supporting plate 20, and its end away from the first supporting plank 31 is slid relative to the supporting plate 20, thereby gradually separating the first supporting plank 31 from the supporting plate 20. Moreover, the opening angle of the first supporting plank 31 relative to the supporting plate 20 is limited by its own length, and this structural design can ensure that the first supporting plank 31 is more stable and reliable during the supporting process. At the same time, when folded and stored, the second supporting plate 32 is accommodated in the second accommodating groove 30b, so as to avoid the increase in the thickness direction of the two due to stacking, that is, the supporting frame 30 is thinner in the thickness direction.

Specifically, referring to FIG. 8 and FIG. 9, the bottom of the first accommodating groove 20a is provided with a strip-shaped hole 20c, and a baffle plate 21 is also provided at the bottom of the first accommodating groove 20a; the baffle plate 21 is extended along the opening and closing direction of the strip-shaped hole 20c and blocked part of the strip-shaped hole 20c, the other end of the second supporting plate 32 is provided with a connecting ear, and the connecting ear is extended into the strip-shaped hole 20c and is clip-connecting to the baffle plate 21. Wherein, the connecting ear is slid in the strip-shaped hole 20c to define the opening and closing angle of the second supporting plate 32 relative to the first supporting plank 31. Here, the strip-shaped hole 20c is used to limit the sliding track of the connecting ear, that is, the connecting ear can only be slid in the opening direction of the strip-shaped hole 20c, and the baffle plate 21 is acted to prevent the connecting ear from coming out off the supporting plate 20. Preferably, the number of connecting ears is two, which are symmetrically arranged on one end of the second supporting plate 32 away from the first supporting plank 31, and the two strip-shaped hole 20c are spaced apart, and the spacing of the strip-shaped hole 20c is the same as the spacing of the two connecting ear.

Referring to FIG. 8, in one embodiment, a block 22 is provided at the bottom of the first accommodating groove 20a, and the block 22 is used to maintain the maximum opening and closing angle of the second supporting plate 32 relative to the first supporting plank 31. It can be understood that when the end of the second supporting plate 32 away from the first supporting plank 31 is guided by the strip hole 20c and slid relative to the supporting plate 20, it is easy to slide around, and the block 22 can be blocked the second supporting plate 20. The end of the supporting plate 32 is prevented from sliding around. Preferably, as shown in FIG. 8, the block 22 is a wedge-shaped block 22, which takes the form of a "front low back high" structure in the thickness direction and is located between two strip-shaped holes 20c. Thus, when it is desired to open the second supporting plate 32, the second supporting plate 32 can easily pass over the "small tip" of the wedge-shaped block 22, and the second supporting plate 32 is blocked by the "large tip" of the wedge-shaped block 22, thereby preventing the second supporting plate 32 from falling back.

Referring to FIG. 6, in one embodiment, the first supporting plank 31 is provided with a first reinforcing rib structure 311. The first reinforcing rib structure 311 can improve the structural strength of the first supporting plank 31 and avoid the occurrence of breakage. Optionally, the first reinforcing rib structure 311 is a plurality of "regular hexagonal" ribs arranged in an array. Of course, the first reinforcing rib structure 311 can also be in other shapes, for example, an equilateral triangle, a circle, and the like.

Similarly, referring to FIG. 5 and FIG. 6, in one embodiment, the supporting plate 20 is provided with a second reinforcing rib structure 23. The second reinforcing rib structure 23 can improve the structural strength of the second supporting plate 32 and avoid the occurrence of breakage. Optionally, the second reinforcing rib structure 23 is a plurality of "regular hexagonal" ribs arranged in an array. Of course, the second reinforcing rib structure 23 can also be in other shapes, for example, a regular triangle, a circle, and the like.

Figure 3:
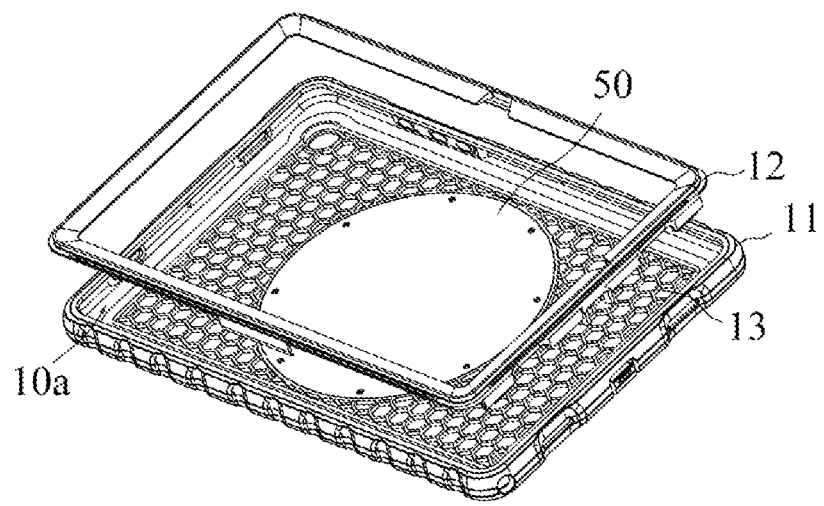
FIG. 3 is an exploded view of the mobile termination protective shell according to an embodiment of the present disclosure.
Figure 4:
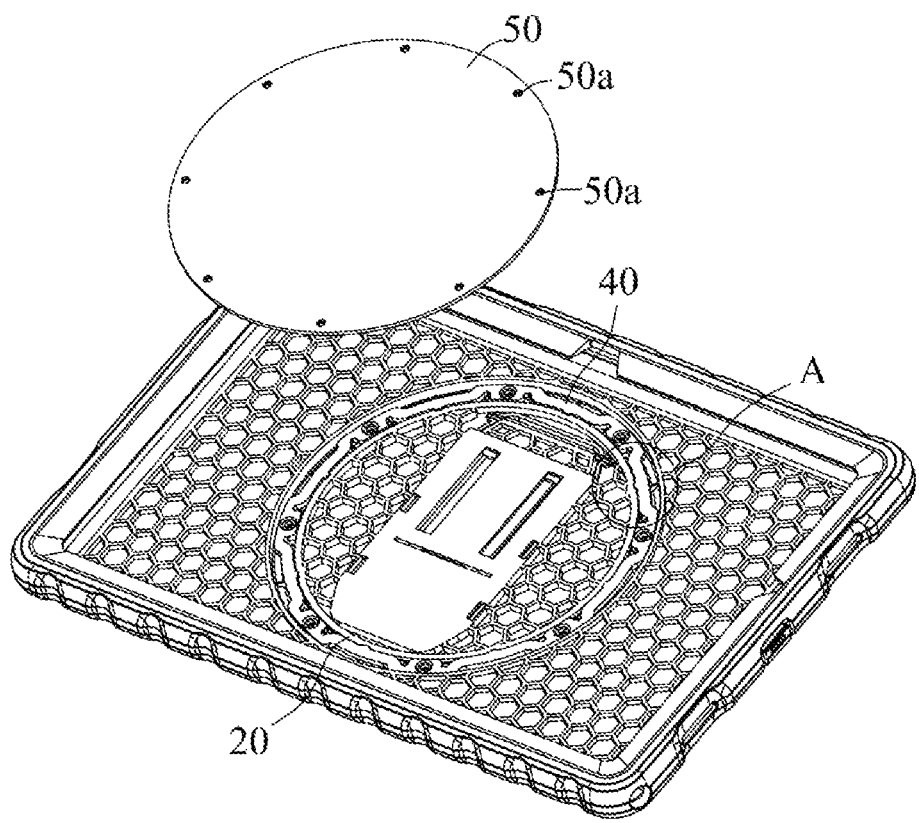
FIG. 4 is an exploded view which is another angle of the mobile termination protective shell according to an embodiment of the present disclosure.

Referring to FIG. 3, the shell body 10 includes: a lower protective cover 11, a upper protective cover 12 fastened to the lower protective cover 11, and the lower protective cover 11 is provided with the through hole 10b. Understandably, when in use, the upper protective cover 12 is removed from the lower protective cover 11, the mobile termination is placed in the accommodating space, the upper protective cover 12 is snapped onto the lower protective cover 11. For example, the upper protective cover 12 is connected to the lower protective cover 11 through a snap structure; alternatively, the upper protective cover 12 may also be connected to the lower protective cover 11 through screws.

Referring to FIG. 3, in one embodiment the lower protective cover 11 is provided with a third reinforcing rib structure 13. The third reinforcing rib structure 13 can improve the structural strength of the lower protective cover 11 and avoid the occurrence of breakage. Optionally, the third reinforcing rib structure 13 is a plurality of "regular hexagonal" ribs arranged in an array. Of course, the third reinforcing rib structure 13 can also be other shapes, for example, a regular triangle, a circle, and the like.

Referring to FIG. 6, in one embodiment, the lower protective cover 11 is provided with a mounting post 14, the limiting body 41 is provided with a first mounting hole 42b, the inner cover plate 50 is provided with a second mounting hole 50a, and the second mounting hole 50a, the first mounting hole 42b and the mounting post 14 correspond to each other. It can be understood that the inner cover plate 50 and the angle limiter 40 are fixed to the protective lower cover 11 by one screw connection, that is, when connected, the use of screws are reduced and the manufacturing costs are controlled.

Above are only preferred embodiments of the present disclosure and are not intended to limit the present disclosure. Any modification, equivalent replacement and improvement made within spirit and principle of the present disclosure should be included in protective scope of the present disclosure.

What is claimed is:

1. A mobile termination protective shell, comprising:
   a shell body, wherein the shell body is provided with an accommodating cavity for accommodating the mobile termination, and a bottom of the accommodating cavity is provided with a through hole penetrating the bottom of the accommodating cavity;
   a supporting plate, the supporting plate is arranged at the through hole, and the supporting plate is rotated about an axis relative to the shell body around the center point of the through hole;
   a supporting frame, one end of a supporting frame is hinged to the supporting plate, and the other end is opened and closed relative to the supporting plate;
   an angle limiter, the angle limiter is fixed at the through hole and located on the outer peripheral side of the supporting plate, and the angle limiter is used to limit the rotation angle of the supporting plate; and
   an inner cover plate, the inner cover plate is provided on the inner side of the bottom of the accommodating cavity and is used for plugging the through hole;
   wherein the supporting frame includes a first supporting plank and a second supporting plate, the supporting plate is provided with a first accommodating groove for accommodating the first supporting plank, and the end surface of the first supporting plank is flush with the end surface of the supporting plate, and one end of the first supporting plank is hinged to the side wall of the first accommodating groove; a side of the first supporting plank facing the supporting plate is inwardly concave to form a second accommodating groove; one end of the second supporting plate is hinged to the side wall of the second accommodating groove and the other end of the second supporting plate is slidably connected to the supporting plate; the opening and closing direction of the second supporting plate is opposite to the opening and closing direction of the first supporting plank.

2. The mobile termination protective shell of claim 1, wherein the angle limiter includes a plurality of limiting bodies arranged along the circumferential direction of the supporting plate and a connecting arm for connecting two adjacent limiting bodies; the limiting body is fixedly connected to the shell body, and the connecting arm abuts against the circumferential side wall of the supporting plate.

3. The mobile termination protective shell of claim 2, wherein a convex part is provided on the connecting arm; a concave part adapted to the convex part is provided on the circumferential side wall of the supporting plate; when the supporting plate rotated about the axis, each of the convex portions is alternately placed in the corresponding concave portion.

4. The mobile termination protective shell of claim 2, wherein the connecting arm is provided with an insertion slot, the bottom of the shell body is provided with a rib plate adapted to the insertion slot, and the arrangement direction of each rib plate is along the radial orientation of the supporting plate.

5. The mobile termination protective shell of claim 1, wherein the other end of the first supporting plank is provided with a first notch, the side wall of the first accommodating groove is concave inward to form a second notch; and the second notch is corresponded to the first notch.

6. The mobile termination protective shell of claim 1, wherein the bottom of the first accommodating groove is provided with a strip-shaped hole, and a baffle plate is also provided at the bottom of the first accommodating groove; the baffle plate is extended along the opening and closing direction of the strip-shaped hole and blocked part of the strip-shaped hole, the other end of the second supporting plate is provided with a connecting ear, and the connecting ear is extended into the strip-shaped hole and is clip-connecting to the baffle plate; wherein, the connecting ears slide within the strip-shaped hole to define an opening and closing angle of the second supporting plate relative to the first supporting plank.

7. The mobile termination protective shell of claim 6, wherein a block is provided at the bottom of the first accommodating groove, and the block is used to maintain the maximum opening and closing angle of the second supporting plate relative to the first supporting plank.

8. The mobile termination protective shell of claim 1, wherein the first supporting plank is provided with a first reinforcing rib structure.

9. The mobile termination protective shell of claim 1, wherein the supporting plate is provided with a second reinforcing rib structure.

10. The mobile termination protective shell of claim 2, wherein the shell body includes: a lower protective cover, an upper protective cover fastened to the lower protective cover, and the lower protective cover is provided with the through hole.

11. The mobile termination protective shell of claim 10, wherein the lower protective cover is provided with a third reinforcing rib structure.

12. The mobile termination protective shell of claim 10, wherein the lower protective cover is provided with a mounting post, the limiting body is provided with a first mounting hole, the inner cover plate is provided with a second mounting hole, and the second mounting hole, the first mounting hole and the mounting post correspond to each other.

* * * * *